No. 794,493. PATENTED JULY 11, 1905.
F. G. DICKERSON.
MEANS FOR FEEDING CANS TO TIPPING OR SOLDERING MACHINES.
APPLICATION FILED MAY 11, 1903.

6 SHEETS—SHEET 1.

Witnesses
Edward G. Eisfeldt
J B Weir

Inventor
F. G. Dickerson
by Elliott & Hopkins
attys

No. 794,493. PATENTED JULY 11, 1905.
F. G. DICKERSON.
MEANS FOR FEEDING CANS TO TIPPING OR SOLDERING MACHINES.
APPLICATION FILED MAY 11, 1903.

6 SHEETS—SHEET 2.

Fig. 2.

Witnesses:
Edward A. Tiefel
J. B. Weir

Inventor:
F. G. Dickerson
by Elliott & Hopkins
Attys

No. 794,493. PATENTED JULY 11, 1905.
F. G. DICKERSON.
MEANS FOR FEEDING CANS TO TIPPING OR SOLDERING MACHINES.
APPLICATION FILED MAY 11, 1903.
6 SHEETS—SHEET 5.
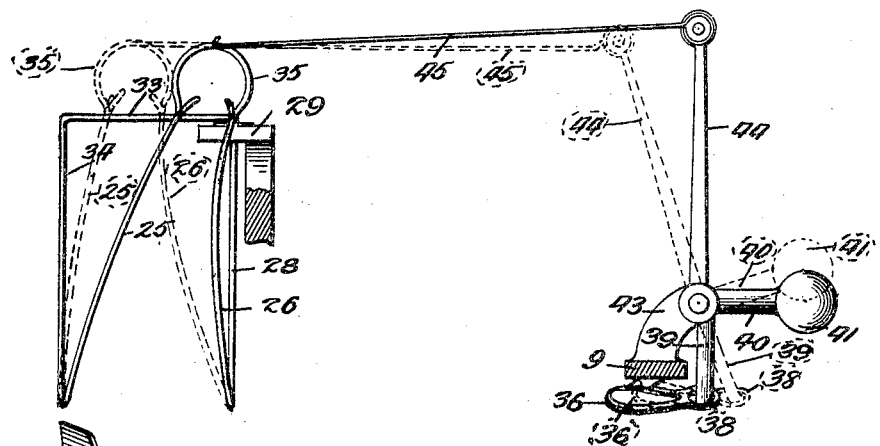
Fig. 5
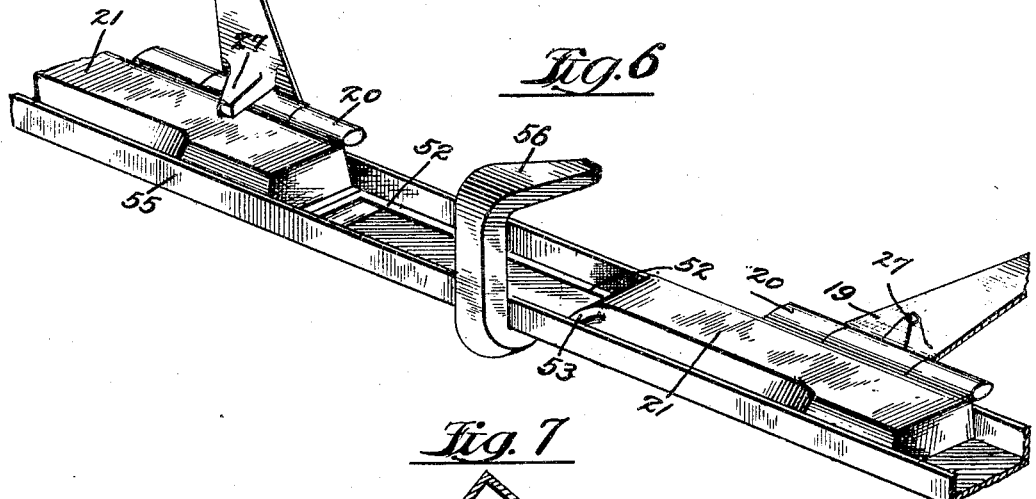
Fig. 6
Fig. 7
Witnesses:
Edward A. Eisfeldt
J. B. Weir
Inventor
F. G. Dickerson
by Elliott & Hopkins
Attys

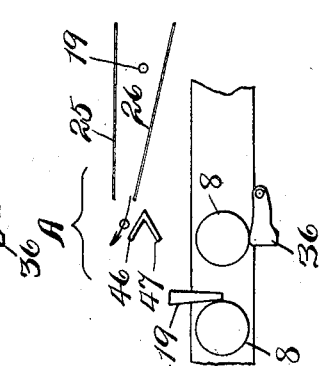
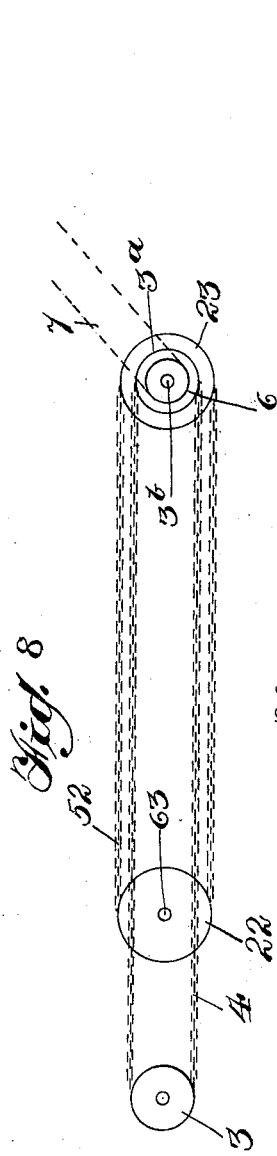
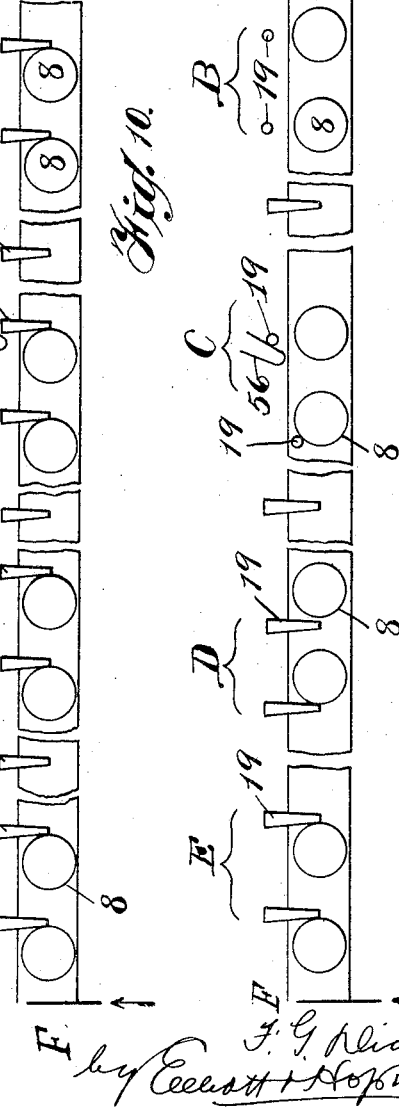

No. 794,493.

Patented July 11, 1905.

UNITED STATES PATENT OFFICE.

FRED G. DICKERSON, OF CHICAGO, ILLINOIS.

MEANS FOR FEEDING CANS TO TIPPING OR SOLDERING MACHINES.

SPECIFICATION forming part of Letters Patent No. 794,493, dated July 11, 1905.

Application filed May 11, 1903. Serial No. 156,535.

*To all whom it may concern:*

Be it known that I, FRED G. DICKERSON, a citizen of the United States, residing at Chicago, in the county of Cook and State of Illinois, have invented certain new and useful Improvements in Means for Feeding Cans to Tipping or Soldering Machines, of which the following is a full, clear, and exact specification.

My invention relates to means for automatically feeding cans regularly and one at a time to tipping or soldering machines usually employed for soldering or sealing the vent in the top of the can; and it has for its primary object to provide improved automatic means for thus feeding or advancing the cans and keeping them the requisite distance apart for the proper operation of the tipping or soldering machine.

With these objects in view my invention consists in certain features of novelty in the construction, combination, and arrangement of parts by which the said objects and certain other objects hereinafter appearing are attained, all as fully described with reference to the accompanying drawings and more particularly pointed out in the claims.

Figure 1:
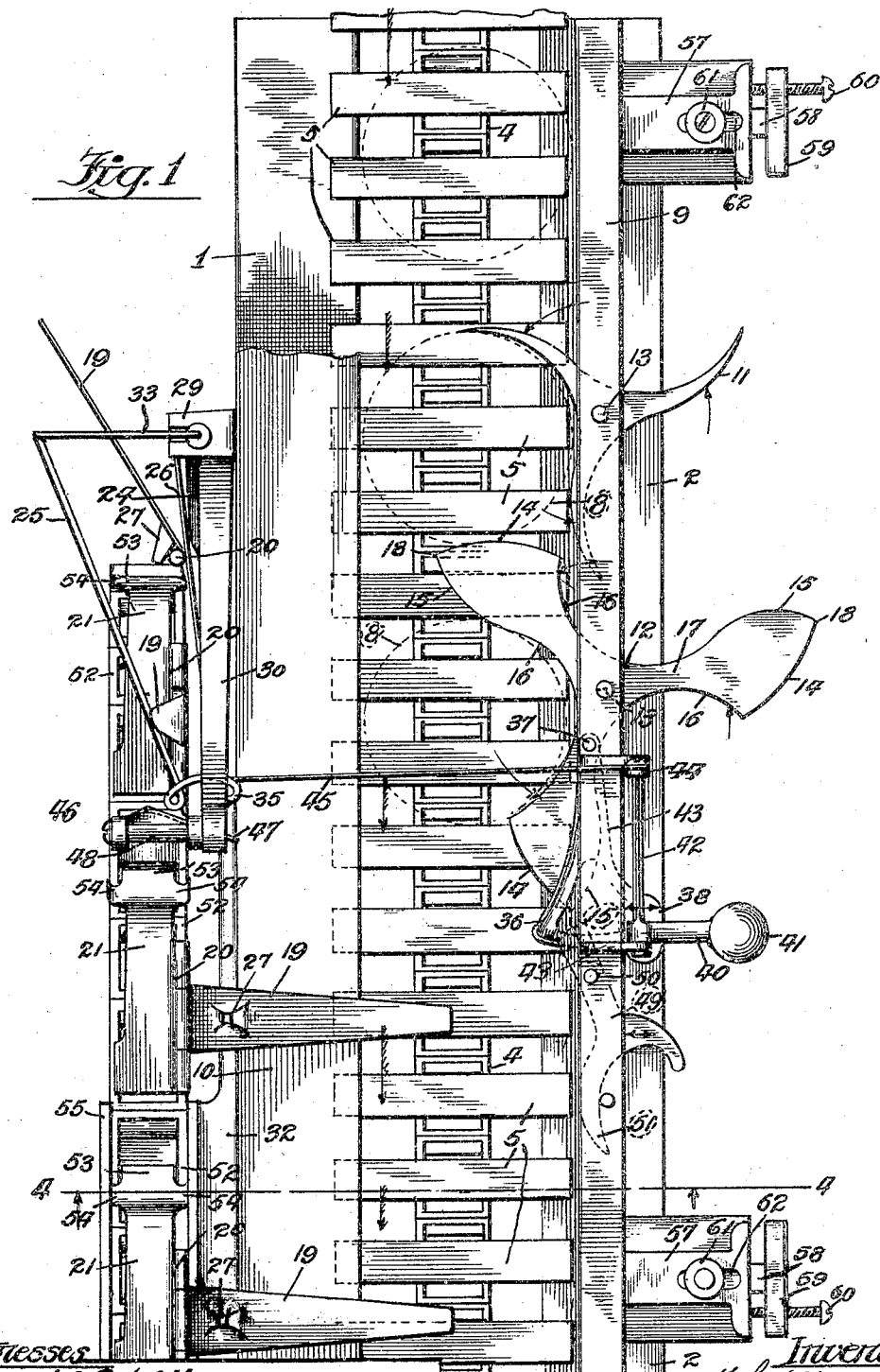
Figure 3:
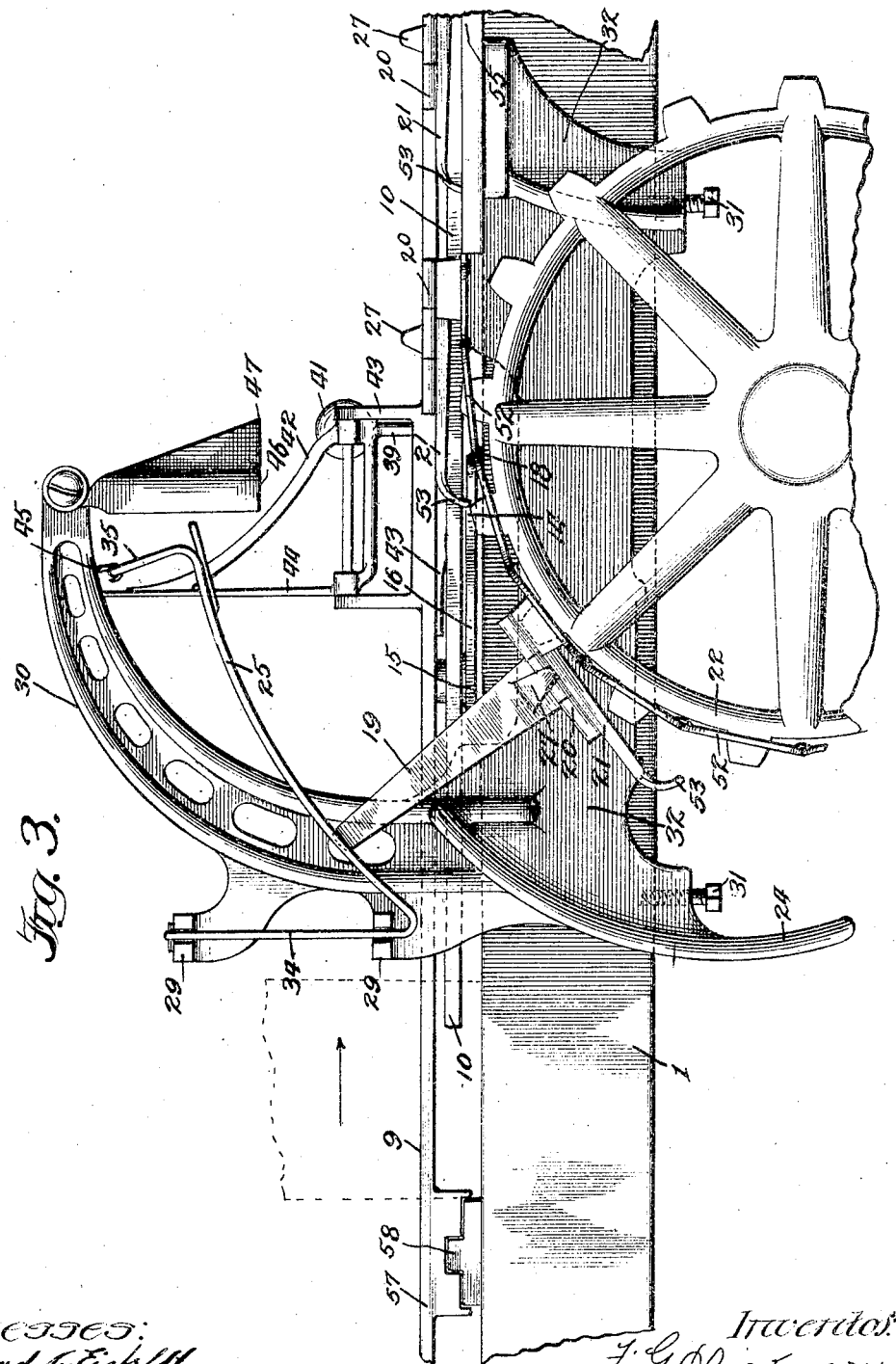
Figure 4:
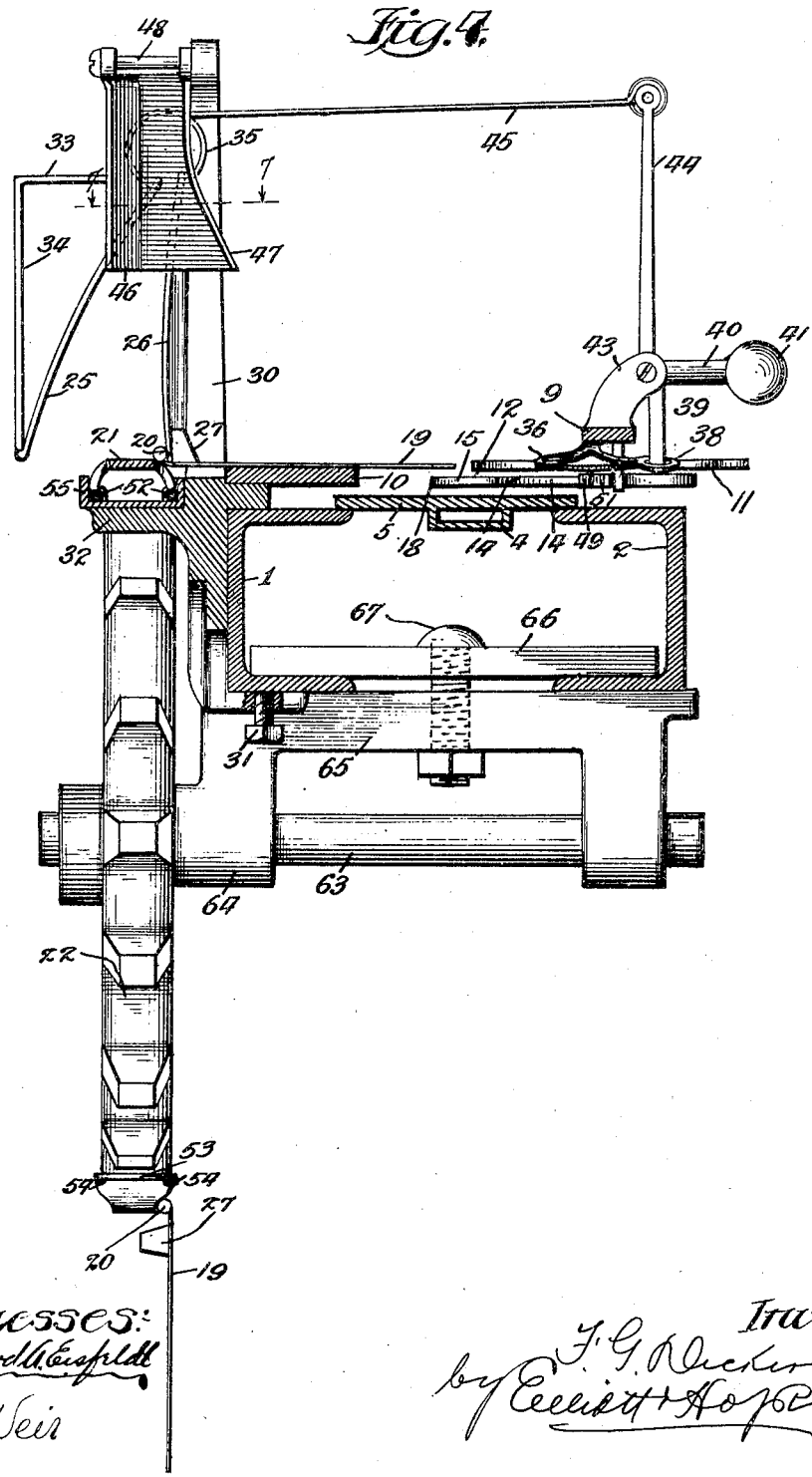

In the said drawings, Figure 1 is a plan view of one end of the runway and conveyer provided with my improvements. Fig. 2 is a similar view taken at another point in the length of the runway. Fig. 3 is a side elevation of the mechanism shown in Fig. 1. Fig. 4 is a vertical cross-section on the line 4 4, Fig. 1. Fig. 5 is a detail view of a switch mechanism hereinafter explained. Fig. 6 is a detail perspective view of a part of the runway and the pushers hereinafter explained. Fig. 7 is a detail horizontal section on the line 7 7, Fig. 4. Fig. 8 is a diagrammatic illustration of the chains and their sprockets. Figs. 9 and 10 are diagrammatic illustrations of two cans passing through the machine at different stages and under different phases, as will be hereinafter explained.

1 2 are horizontal channel-bars or bars of any other suitable construction arranged in a horizontal position and constituting the main frame for supporting the conveyer and operating mechanism. At the ends of this frame are mounted in a vertical plane suitable sprocket-wheels 3 3$^a$, and passing around these sprockets is an endless conveyer comprising a chain 4, having its upper side provided with a number of cross-slats 5, which rest upon the upper faces of the channel-bars 1 and 2, which constitute a runway therefor and serve to carry the upper fold of the conveyer in a horizontal direction. The sprocket 3$^a$, which is secured to shaft 3$^b$, may be driven by pulley and belt 6 7 from any suitable source of power or by any other suitable means.

The conveyer 4 5 constitutes a means of supporting and advancing the cans in a row or successively, the relative positions of the cans being indicated by the dotted lines 8 in Figs. 1 and 2, and in order that the cans may maintain their alinement on the conveyer-slats 5 I provide side rails or guides 9 10, which are suitably secured to the upper side of the channel-bars 1 2 and extend throughout the length thereof or to the point where the tipping or soldering machine is located. Said tipping or soldering machine is not shown in this application and forms no part of this invention, but constitutes the subject-matter of a copending application, Serial No. 166,512, filed July 22, 1903, although it is not necessary so far as this invention is concerned to employ any particular kind of tipping or soldering machine, the purpose of the present invention being merely to properly space and feed the cans or other objects in order that they may be acted upon in the desired way by the tipping-machine or other apparatus.

The endless conveyer 4 5 is driven in the direction of the arrow in Figs. 1, 2, and 3, and the cans are placed on the left-hand end thereof, as viewed in Fig. 3, by hand or other suitable means and are advanced by their frictional contact only with the cross-slats 5 until they reach the spacing mechanism, which will now be described, and after being properly spaced are advanced by positive pushers and maintained at a proper distance apart until they pass the tipping or soldering machine.

Pivoted at one side of the conveyer 4 5 is a star-shaped wheel comprising three points or wedges 11, whose forward edges are curved on the same or substantially the same arc as the outside of the can and which points may be termed the "initial spacing-wedges" in the operation of the machine. The foremost one of the cans is placed just in advance of one of the points or wedges 11 of the star-wheel, so that it will enter between said can and the next succeeding can, and consequently as the line now advances the cans will successively push against the points or wedges 11 and in revolving the star-wheel cause said points to enter between the succeeding cans and slightly wedge them apart, so as to prepare them for the introduction of still wider wedges on a horizontal wheel or turnstile 12, the aforesaid star-wheel and this wheel 12 being both pivoted in substantially the same horizontal plane just above the surface of the conveyer 4 5 to one of the channel-bars 1 2 and the guide-rail 9 on suitable pivots 13. The wheel 12 is formed with a number, preferably three, of wing-shaped wedges much wider or more obtuse than the wedges 11, and their forward edges are so curved as to be complementary in form to the outside diameter of the cans or at least wide enough between the wedges to permit the can to pass while in close relation to both guides 9 10. The wings or wedges of the wheel 12 are each formed at the outer end on a wide arc or curve 14 on one side and a compound curve 15 on the other side of less radius than the curve 14, the inner end of the curve 14 terminating at an inward reverse curve 16, forming a narrow neck 17 with the inner end of compound curve 15. The outer ends of curves 14 15 constitute the point 18 of the wedge which is adapted to enter the space between the cans formed by the wedges 11, and as the cans advance, pushing against the wedges of wheel 12, the outer ends of the latter act to wedge the cans apart a certain distance and hold them at that distance apart while the line of cans advances. The purpose of this spacing of the cans is primarily to allow the pushers 19 to engage behind them in order that they may be positively advanced along the runway without depending upon the mere fractional traction of the conveyer 4 5.

The pushers 19 are in the form of lugs extending horizontally across one of the guides 9 10 (the guide 10) and projecting a sufficient distance over the conveyer 4 5 to engage the cans at a point substantially in the center of the conveyer. Each of the pushers 19 is hinged at 20 to a bar or plate 21 and when in operation rests by gravity upon the guide-rail 10, and the plates or bars 21 constitute parts of a continuous chain or belt running over sprockets 22 23, secured to shafts 63 $3^b$, respectively, so that while the pushers 19 are not in operation, but are on the lower fold of the belt, they will swing downwardly in a perpendicular position, as shown in Fig. 4. As the pushers come around the upper side of the sprocket 22 (see Fig. 3) they are maintained in their radial or outwardly-projecting position by any suitable guide 24, secured to the side of the frame or bar 1, until their extremities engage between two converging guide-rails 25 26 of a switch which under certain conditions serves to throw the pushers 19 downwardly against the rail 10 into their horizontal position in readiness to engage behind one of the cans should the same be in position to permit of that action of the pusher. The cans being properly spaced by the wheels 11 12, as before described, when the space between two cans arrives at a point diametrically opposite the converging ends of the switch-bars 25 26 one of the pushers 19 will drop transversely of the runway and engage between the cans in said space and will continue to advance or push the can in front thereof throughout the balance of its travel. It is not necessary, however, that the pusher 19 fall directly between the cans, for it would be safe and serve the purpose if it fall either in the space between them or at any point on the forward half of either can, inasmuch as the pushers gain on the conveyer 4 5, as hereinafter explained, and will eventually seek their proper operative positions between the cans should they fall against the forward half of any of them. If, however, anything should transpire to make the foremost can or the can just in advance of the one within the embrace of the wheel 12 too early to produce this result, the action of the switch 25 26 in that event will be to throw the pusher 19 outwardly or away from the can, so that it will lean backward in the manner shown on the left in Fig. 6 as it comes on the upper fold of the chain and not immediately fall into an active position on the rail 10, the upper side of each of the pushers 19 being provided with a boss or stop 27, which comes against the upper side of plate 21 and supports the pusher in the outwardly-inclined position. In order to bring about this automatic action of the switch 25 26, the latter is pivoted on a vertical pivot 28, which is shown as a continuation of the bar 26, and this vertical pivot is journaled in two supports 29, formed on a frame 30, constituting, if desired, a part of the guide 24 and secured by screws 31 and flanges 32 or other suitable means to bar 1. For convenience of construction the bars 25 26 of the switch are formed of an integral piece of wire or other material whose intermediate portion is bent to form the pivot 28 and thence carried across horizontally, as shown at 33, and then downwardly, as shown at 34, to connect with the lower end of bar 25. The converging ends of bars 25 26 are connected together by an upwardly-extending yoke 35, which renders them rigid while permitting the extremity of the pusher 19 to pass between them. This yoke 35 or some other part of the switch 25 26 is suitably connected with a trip 36, arranged to extend into the line of movement of the cans and so positioned with relation to the extremity of the switch 25 26 that when it is deflected or pushed outward by a can which is not in proper position to be engaged by one of the pushers 19 it will throw the converging ends of the switch-bars 25 26 outwardly, and thereby tilt the pusher which happens to be passing through into a backwardly-inclined position, as shown in Fig. 6, preventing it from falling improperly against the can; but should the can be either in the rear or in advance of the trip 36 the pusher 19 will fall into its horizontal operative position. The trip 36 is pivoted at 37 to the under side of the guide-rail 9 or to any other suitable support and is provided with an eye 38, in which engages one arm 39 of a bell-crank lever, whose other arm 40 is provided with a weight 41, serving to normally force the trip 36 inwardly toward the can-path and also to hold the switch 25 26 normally inward, as shown in the drawings, to compel the pushers to drop into their horizontal position. The bell-crank 39 40 is secured to or formed on a horizontal shaft 42, pivoted in a suitable bracket 43, supported on rail 9, and the shaft 42 is secured to an upright lever 44, which is extended upwardly a sufficient distance to get above the cans and is connected at its upper end by rod 45 with yoke 35 of the switch.

In order to better insure the desired direction of tilting of the pushers 19, I prefer to employ in front of the switch 25 26 a V-shaped frog comprising two inclined or oblique side portions 46 47, depending or swinging from a horizontal pivot 48, secured to the upper end of frame 30. In cross-section the side members 46 47 of this frog form a V, and the apex or point of the V is so located that when the switch 25 26 is in its normal position (shown in Fig. 4) said apex will be outward from the space between the ends of the switch-bars 25 26, and consequently the pusher 19 will be thrown against the inner oblique side 47 of the frog, and thereby directed to its downward horizontal position; but when the switch is thrown outwardly the opening between switch-bars 25 26 will be opposite the outer oblique side 46 of the frog. The frog is pivoted, so that in the event one of the pushers 19 should strike the same directly against the apex it would yield without damage.

In addition to the spacing devices already described I also employ a can-arrester in the form of a lever 49, pivoted at 50 to the under side of rail 9 or other suitable support in a horizontal plane and having a rounded or curved end 51 adapted to be deflected outwardly by the passing cans in such a way as to cause the opposite end of the lever to project inwardly into the path of the cans. By this device it must be seen that the rear end of lever 49 will project into the line of movement of the cans and arrest the next foremost can, permitting the conveyer 4 5 to slide under it so long as one of the cans is passing the curved end 51, and consequently should the latter can be a little late the next can will be arrested until the forward one has passed the end 51, whereupon the opposite end of the lever will be deflected outwardly by the pressure of the can thereagainst and the curved end 51 deflected inwardly.

The plates or bars 21, to which the pushers 19 are hinged, are each secured at one end to one of the links of the chain or belt 52, which runs around the sprockets 22 23, and these bars or plates 21 are suitably elongated lengthwise of said chain 52, so as to rigidly hold the pushers 19 against undue oscillation when they engage the cans. In order, however, that the elongated bars 21 may pass around the wheels 22 23, they are attached to the chain only at one end, while the other end extends across one or more of the links of the chain and is provided with a lug or downward projection 53, which engages in one of the links, and with notches 54, which engage over the side bars of the links, so as to rigidly hold the plates 21 against transverse deflection and make them virtually a part of the chain during the operation of the pushers 19. These plates 21 and the upper fold of the chain 52 are supported and guided in a runway or trough 55, secured to the side of the channel-bar 1.

56 is a deflector arranged obliquely across the upper side of the chain 52 and extending obliquely to the line of travel of the standing pushers 19, so that when the pushers 19, which are standing up, reach the deflector they will be thrown down in their operative position. The two chains 4 and 52 are driven at differential speeds, the latter at the higher speed by virtue of the larger sprockets 22 23, so that the pushers 19 will gradually gain on the cans moving with the chain 4. The difference in speed is such that by the time a can passes from the can-arrester 49 to a position just in advance of the deflector 56 the pusher 19 will have gained on the chain 4 a sufficient distance to enable it to fall either between the cans or against the forward side of the hindmost one of the two adjacent to the deflector. Hence the deflector 56 insures that none of the pushers 19 will fail to assume their horizontal operative position before they reach the limit of their travel and that each can before it reaches the tipping or soldering machine at the end of the conveyer will be engaged in the rear by one of the pushers if the soldering-machine be placed a sufficient distance from the deflector 56.

The operation of the deflector 56 on the pushers 19 and the relation of the cans to one another and to the switch 47 and said pushers may be best understood from the diagrammatic illustrations contained in Figs. 9 and 10. In each of these figures two of the cans are shown at different positions, which are indicated at A, B, C, D, and E in the length of the runway or travel. In Fig. 9 the two cans in the position A bear such a relation to the pusher 19, which is about to fall or to be thrown down by the switch 47, that said pusher will drop between the cans, and consequently be in readiness to engage the front can and push it forward positively by the time the pusher overtakes it as a result of the difference in travel of the pusher and the conveyer-belt 4, which takes place before the can reaches the end of its travel or the point where it is to be operated upon by the tipping-machine or other device, which is indicated at the left-hand end of the figure by the line F. If the cans always arrived at this position (indicated at A in Fig. 8) when pusher 19 is about to fall there would be no need of the deflector 56 or the other half of switch 47 for throwing the pushers into their upright position, for it is evident should the pusher fall anywhere between the transverse diameter of the can on the right and the extreme rear side of the can on the left it will eventually find its position against the rear side of the forward can by reason of its greater speed of travel than the cans; but should the forward can be in such a position when the pusher 19 reaches the switch 47 that the pusher, if it should fall, would strike against the rear half thereof it is evident that the accelerated speed of the pusher would result in the can being pushed over. This position is indicated in Fig. 10, and it is seen that the switch 25 26 is at this time thrown in such a position by the trip 36 as to prevent the pusher 19 from falling against the can, and consequently the pusher 19 remains in its upright position until it reaches the deflector 56, whereupon it is thrown down into its horizontal position and falls either against the forward half of the rear can or between the cans and in either event overtakes the forward can and advances it positively before the latter reaches the point F, the speeds of the conveyer 4 and the pushers 19 being so relatively proportioned that the two cans will bear the described relation to the deflector 56 by the time pusher 19 reaches the deflector.

In order that cans differing slightly in diameter may be run through the same machine, the side guide-rail 9 is made adjustable by any suitable means, such as by supporting the same upon slides 57, arranged on transverse guide-blocks 58, supported upon bar 2 and having flanges 59, in which are threaded adjusting-screws 60, impinging slides 57 in such a way that the slides may be adjusted or forced inwardly thereby, the slides being secured in position by set-screws 61 passing through slots 62 in the slides 57 and entering the guide-blocks 58.

The supports and journals for the various sprocket-wheels 3 are immaterial. In Fig. 4 the shaft 63 is journaled in bearings 64, formed on a bracket 65, which is clamped to the under side of channel-bars 1 2 by a cross-bar 66 and a bolt 67; but these are mere mechanical details which may be followed or not for the other sprockets.

While I have particularly described my invention as a means for feeding cans to a tipping or soldering machine as a convenient designation or title for the invention, it will nevertheless be understood that the invention is equally applicable for feeding any other similar objects to any other machine or apparatus where substantially the same conditions and requirements arise, and I therefore do not limit myself to this particular use of the invention.

Having thus described my invention, what I claim as new therein, and desire to secure by Letters Patent, is—

1. In a machine for the purpose described the combination of the runway for the cans, means for yieldingly propelling the cans along said runway, means for spacing the cans on the runway, and a longitudinal series of positively-driven pushers extending and traveling lengthwise of the runway for positively propelling the cans on the runway after they are spaced.

2. In a machine for the purpose described, the combination of a runway for the cans, means for yieldingly propelling the cans along said runway, a revolving series of wedges for spacing the cans on said runway, and positive propelling means for engaging the cans on the runway.

3. In a machine for the purpose described, the combination of a runway for the cans, means for yieldingly propelling the cans along said runway, and two revolving series of wedges of different widths for spacing the cans on said runway.

4. In a machine for the purpose described, the combination of a runway for the cans, means for yieldingly propelling the cans along said runway, positive propelling means for the cans, adapted to engage the cans at a certain point in the length of the runway, and a pivoted can-arresting lever arranged contiguous to the runway and adapted, when oscillated, to alternately project its ends into the line of movement of the cans for arresting the cans in the rear until the foremost can has passed the said point.

5. In a machine for the purpose described, the combination of a runway for the cans, means for yieldingly propelling the cans along said runway, positive means for engaging the cans at a certain point in the runway and propelling them therealong, a can-arrester consisting of a lever pivoted on a vertical pivot adjacent to the runway, and having a curved end adapted to project into the line of movement of the cans for forcing the opposite end of the lever against the can in the rear until the can in front has passed said curved end.

6. In a machine for the purpose described, the combination of a runway for the cans, means for spacing the cans on said runway, and a series of vertically-movable hinged pushers for engaging the cans and propelling them along the runway when spaced.

7. In a machine for the purpose described, the combination of a runway for the cans, means for spacing the cans on said runway, an endless traveling series of pushers for engaging the cans and advancing them along the runway when spaced, and means for automatically throwing said pushers into engagement with the cans.

8. In a machine for the purpose described, the combination of a runway for the cans, means for spacing the cans on said runway, an endless series of traveling independently-movable pushers for engaging the cans on the runway when spaced, means for throwing said pushers into or out of operative position with relation to the cans, and means actuated by the cans for operating the last-said means.

9. In a machine for the purpose described, the combination of a runway for the cans, means for spacing the cans on said runway, traveling independently-movable pushers for engaging the cans on the runway, a switch for throwing said pushers into or out of operative relation to the cans, and a trip arranged in the path of the cans for actuating said switch.

10. In a machine for the purpose described, the combination of a runway for the cans, means for spacing the cans on said runway, a series of traveling pushers hinged on horizontal axes extending lengthwise of the runway for engaging the cans on the runway when spaced, and means for throwing said pushers into engagement with the cans.

11. In a machine for the purpose described, the combination of a runway for the cans, a series of traveling pushers for engaging the cans on the runway, independently movable vertically, means for throwing said pushers into engagement with the cans on the runway, and means arranged in operative relation to the cans on the runway for throwing said pushers into an inoperative position when a can is not in proper position to be engaged thereby.

12. In a machine for the purpose described, the combination of a runway for the cans, an endless series of traveling independently-movable pushers for engaging the cans on said runway, adapted to stand in an inoperative position, a switch for directing said pushers into an operative position with relation to the cans, and means operatively related to the cans for actuating said switch.

13. In a machine for the purpose described, the combination of a runway for the cans, an endless series of traveling pushers hinged to lie horizontally and to also stand upright while passing over the upper side of the series and to hang downwardly while passing along the lower side of the series, a switch for engaging said pushers while in their standing position and directing them into either a backward position away from the runway or a horizontal position across the runway, and means arranged in operative relation to the cans on the runway for actuating said switch.

14. In a machine for the purpose described, the combination of a runway for the cans, a traveling belt, plates secured to one end of said belt and having disengageable connection at the other end to said belt, whereby the belt may turn abruptly, and pushers for advancing the cans on the runway, secured to said plates.

15. In a machine for the purpose described, the combination of a runway for the cans, means for yieldingly propelling the cans along said runway, positively-operated means for engaging and propelling the cans at a certain point in the length of the runway, a deflectable can-arrester arranged contiguous to said point for holding back the cans in the rear until the foremost can has passed said point, comprising means for holding said arrester in the path of the cans by said foremost can.

16. In a machine for the purpose described, the combination of a runway for the cans, an endless traveling belt comprising links, plates rigidly secured at one end to said links and projecting across another link, and having a depending portion engaging in a third link, and pushers for engaging the cans on the runway, secured at an angle to said plates.

17. In a machine for the purpose described, the combination of a runway for the cans, a movable series of pushers for engaging and advancing the cans on the runway, hinged to fold backwardly away from the runway, a pivoted switch for throwing said pushers downwardly into engagement with the cans, a pivoted deflectable trip, yielding means for normally holding said trip in the line of movement of the cans, and an operative connection between said trip and switch.

18. In a machine for the purpose described, the combination of a runway for the cans, means for yieldingly propelling the cans along said runway, positive propelling means for also advancing the cans along the runway, means for actuating the two said propelling means at different rates of speed, said second propelling means comprising hinged pushers for engaging the cans adapted to stand upright out of engagement with the cans, and a deflector arranged in the line of movement of said pushers for throwing them down into operative position.

19. In a machine for the purpose described, the combination of a runway for the cans, a traveling series of hinged pushers for engaging the cans on the runway, adapted to lean away from the runway or fall down across the runway, means for directing said pushers into either of said positions, and a yielding frog arranged in front of the last said means in position to be engaged by said pushers.

F. G. DICKERSON.

Witnesses:
F. A. HOPKINS,
M. B. ALLSTADT.